Dec. 30, 1958     L. WARD     2,866,225
REMOVAL HINGE
Filed May 15, 1956     2 Sheets-Sheet 1
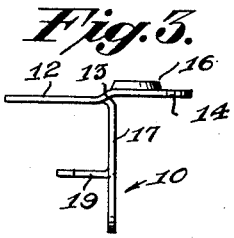
Fig. 3.
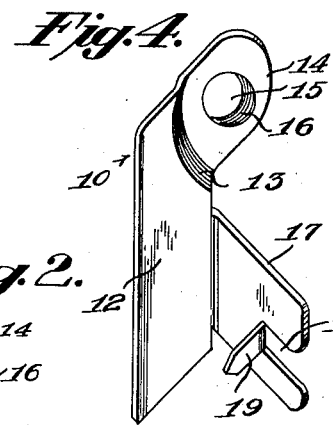
Fig. 4.
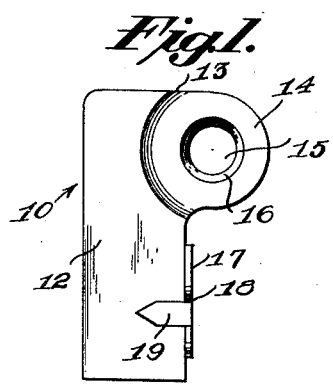
Fig. 1.
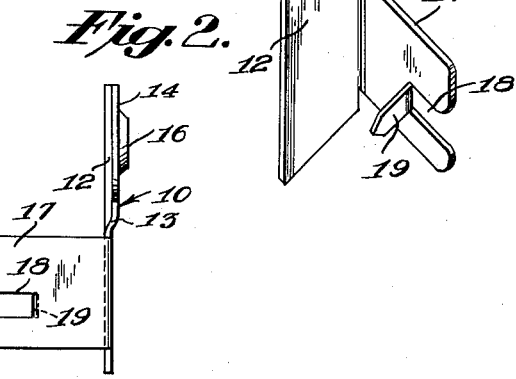
Fig. 2.
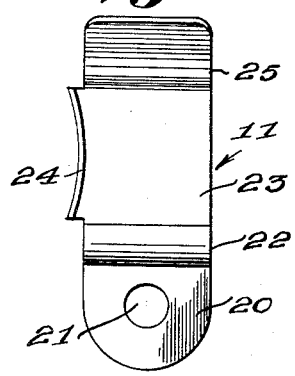
Fig. 5.
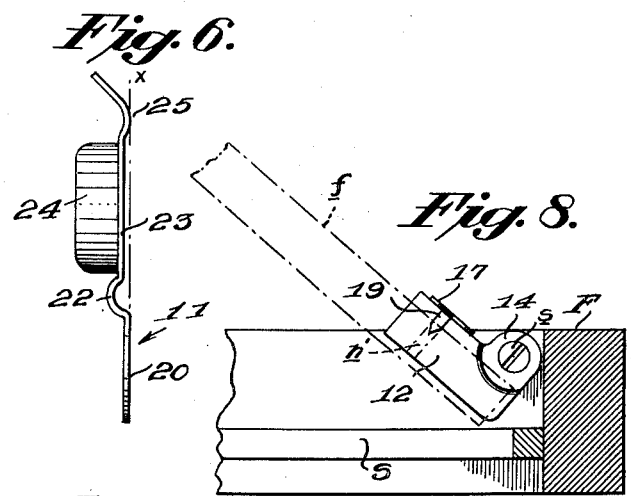
Fig. 6.
Fig. 8.
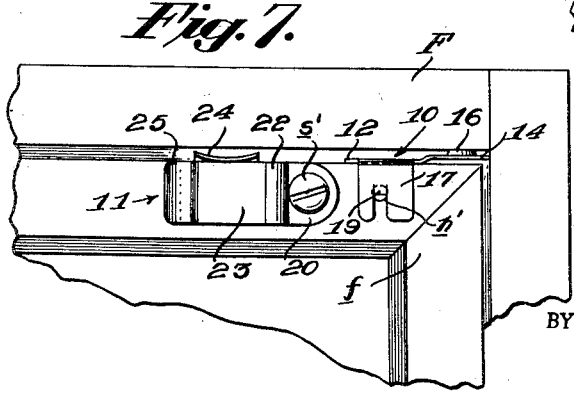
Fig. 7.
INVENTOR
Lyle Ward.
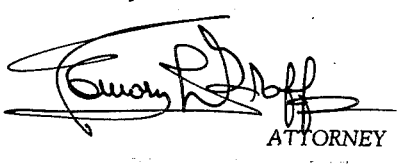
BY
ATTORNEY Dec. 30, 1958 L. WARD 2,866,225
REMOVAL HINGE
Filed May 15, 1956 2 Sheets-Sheet 2
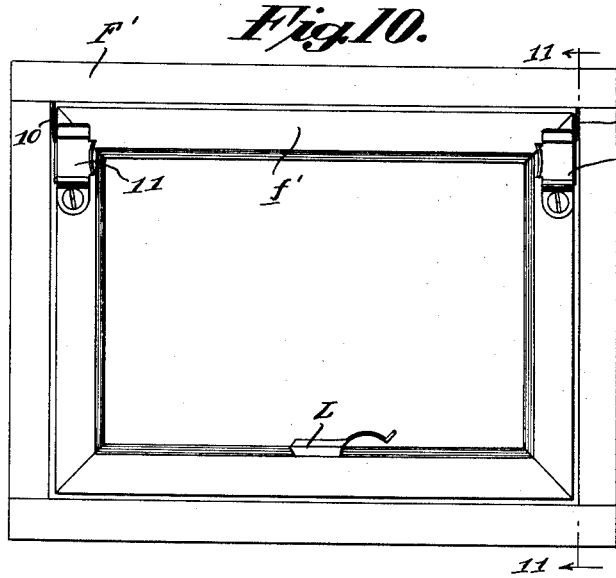
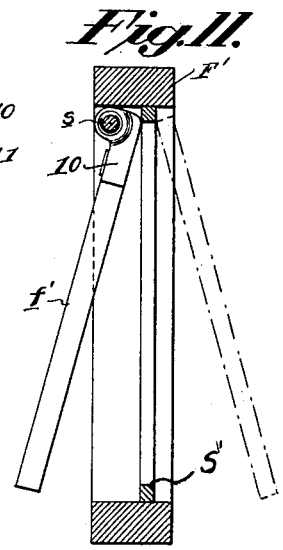
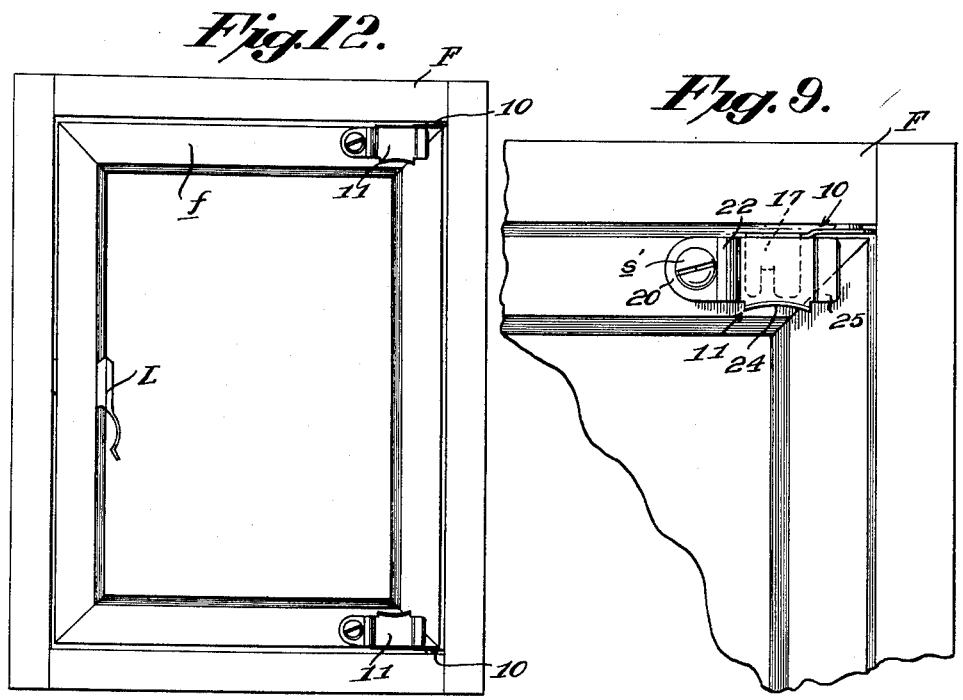
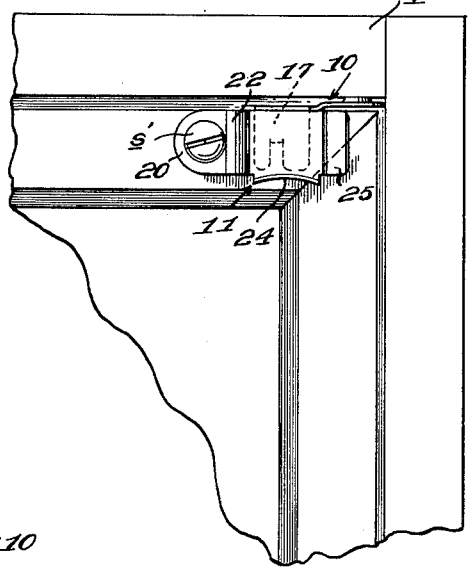
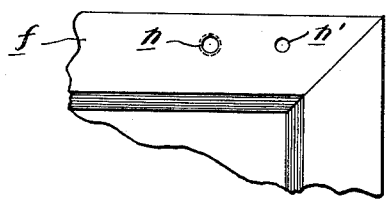
INVENTOR
Lyle Ward
BY
ATTORNEY

United States Patent Office 2,866,225
Patented Dec. 30, 1958

2,866,225

REMOVAL HINGE

Lyle Ward, Hudson, Wis., assignor to Andersen Corporation, Bayport, Minn., a corporation of Minnesota Application May 15, 1956, Serial No. 585,056

3 Claims. (Cl. 16—149)

This invention relates to a hinge structure.

The invention is more particularly concerned with a hinge structure for the removable pivotal connection of an inner frame with a fixed outer frame and which hinge structure is particularly characterized in facilitating the ready mounting and dismounting of the inner frame.

While the improved hinge structure is not limited in its adaptation it is of particular use in the pivotal connection of an inner sash or screen frame with an outer fixed frame, such as in awning type and casement type windows each of which includes a fixed outer frame and a pivotal inner sash or screen supporting frame pivotally connected to the outer frame for inward swinging movement relative thereto.

The outer frame in each instance includes a stop or rabbet against which the inner pivoted sash frame bears when in closed position.

In the awning type window however, the sash frame is pivoted to the upper horizontal side of the fixed frame, whereas in the casement type window the sash frame is pivoted to a vertical side of the fixed frame.

As is generally known, screen frames and storm window frames have seasonal uses and accordingly are assembled and disassembled periodically.

Furthermore, screens accumulate dust and other foreign matter and it is accordingly necessary to brush clean the same at frequent intervals. This can be most satisfactorily accomplished upon removing the screen frame, particularly when it is inwardly swingable, as otherwise the brushed away matter would for the most part enter the room.

Both screen frames and storm window frames have heretofore been usually pivotally connected to the fixed outer frame by separable hinges and considerable effort and time was required to effect a connection and disconnection between the inner and outer frames.

It is accordingly a primary object of this invention to provide a hinge by the use of which the above noted objections are wholly overcome.

A further object of the invention is the provision of a hinge embodying a pair of cooperating members, one of which is adapted for pivotal connection with a fixed outer frame and is removably engageable with an inner frame, and the other of which is adapted for pivotal connection with the inner frame and for contact with the first member for holding same in operative engagement with the inner frame.

Other objects and advantages of the invention will become apparent in the course of the following detailed description, taken in connection with the accompanying drawings, wherein Fig. 1 is a side elevational view of the hinge member adapted to be pivotally mounted on the outer frame.

Fig. 2 is a front elevational view of the hinge member adapted to be pivotally mounted on the outer frame.

Fig. 3 is a plan view of the hinge member adapted to be pivotally mounted on the outer frame as observed from the top of Fig. 1.

Fig. 4 is a perspective view of the hinge member adapted to be pivotally mounted on the outer frame.

Fig. 5 is a front elevational view of the hinge member adapted to be pivotally mounted on the inner frame.

Fig. 6 is a side elevational view of the hinge member adapted to be pivotally mounted on the inner frame.

Fig. 7 is a fragmental plan view of an outer fixed frame and an inner swingable frame and showing one of the improved hinges in partially assembled position.

Fig. 8 is a horizontal sectional view of the outer frame adjacent a corner thereof together with the inner frame shown in dot and dash lines and wherein the hinge member adapted to be pivotally mounted on the outer frame is shown in outwardly swung position for facilitating removal of the inner frame from the outer frame.

Fig. 9 is a view similar to Fig. 7 but showing the inner and outer frame hinge members in fully assembled cooperating relation.

Fig. 10 is an elevational view of an awning type window showing the application of the present invention thereto.

Fig. 11 is a vertical sectional view in the plane of line 11—11 on Fig. 10 showing the inner frame in an inwardly swung position together with an outer sash frame shown in dotted lines in outwardly swung position.

Fig. 12 is an elevational view of a casement type window showing the application of the present invention thereto.

Fig. 13 is a fragmental corner view of an inner frame with holes for securement of the hinge members thereto.

Referring now in detail to the drawings, and first to Figs. 1 to 6 thereof, the outer or fixed frame hinge member is designed in its entirety as at 10 while the inner swingable locking member is designated in its entirety as 11.

The hinge member 10 is shown in detail in Figs. 1 to 4 and may be made of any suitable material. Preferably, however, the said hinge member comprises a stamping of relatively thin gauge steel, for example stainless steel, and such stamping includes a generally rectangular body 12 which is outwardly offset adjacent one end and one side thereof as indicated at 13 and thence continued in the form of an ear 14 which is provided with an aperture 15 which is outwardly countersunk as indicated at 16.

The said body 12 is provided at said one side thereof with a right angular rectangular extension 17 which is inwardly slit at 18 and the freed portion is bent into spaced parallel relation with the body 12 in the form of a pointed tongue 19.

The hinge member 10 is adapted for pivotal connection with an outer fixed frame F of a casement-type window (Fig. 12) or with the outer fixed frame F' of an awning-type window (Fig. 10).

In the casement-type window of Fig. 12 a hinge member 10 is pivotally connected to the upper and lower horizontal parts of the frame adjacent corners at one side of the frame.

As is indicated more particularly in Figs. 7 and 9, the offset ears 14 are disposed in said corners and pivotally connected to the frame by means of screws $s$ (Fig. 8) and since the main body portions 12 are offset with relation to said ears same will be in spaced relation to the frame for free swinging movement of the hinge members 10 about the screws $s$.

The inner swingable frame is designated $f$ in Fig. 12 and $f'$ in Fig. 10 and same may be formed of stainless steel and adapted for supporting a screen or a storm sash.

As is indicated in Fig. 13 the frame $f$ is provided with a hole $h'$ adjacent each corner corresponding to the corners of the fixed frame in which the members 10 are swingably supported and the frame $f$ is further provided with a tapped hole $h$ adjacent each hole $h'$ for a purpose later to appear.

It is of course to be understood that frame $f'$ is also provided with holes similar to holes $h$ and $h'$ but disposed in the upper ends of its vertical stiles.

The hinge members 11 are each of generally rectangular form and comprise an ear 20 at one end thereof, which is provided with a screw receiving aperture 21. The ear 20 of the hinge member adjoins a portion thereof outwardly arched at 22 and from one edge of the arched portion extends a planar portion 23 whose inner wall is in outwardly spaced relation to the inner wall of ear 20 as is clearly indicated by line $x$ on Fig. 6.

The said member 11 is provided with a curved finger grip 24 which projects outwardly from said portion 23 and along one side of the member and the member at its opposite end is provided with an outwardly flared portion which is united to portion 23 by an inwardly directed convex portion 25 as indicated in Fig. 6.

The member 11 is pivotally secured to the inner frame $f$ or $f'$ by means of a screw $s'$ which extends through the aperture 21 and is threaded into the hole $h$.

The member 11 is swingable about the axis of screw $s'$ to and from the alternate positions, as shown in Figs. 7 and 9. The member 11 is in the position of Fig. 7 for mounting or dismounting the inner frame $f$ or $f'$. The member 11 in Fig. 7 is in position for the member 10, which has been pivotally secured to the outer frame and is swung inwardly as in Fig. 8 permitting an edge of the inner frame to be pushed over the extension 17 to a position, wherein the tongue 19 enters the hole $h'$. Thereafter the member 11 is swung from the inoperative position in Fig. 7 to the operative position in Fig. 9, wherein same overlies the extension 17 and removably retains the tongue in the hole $h'$, thereby providing an effective hinge connection between the inner and outer frames.

It is to be particularly observed that the portion 25 of member 11 has a yieldable frictional bearing contact with the inner frame, whereby the members 11 are maintained in closed operative position.

The finger grips 24 provide for easy swinging of the members 11 to and from operative position. The inner frame $f$ or $f'$ is provided with a suitable latch L and in each instance of the awning-type window in Fig. 10 and the casement-type window in Fig. 12 wherein the windows swing outwardly as indicated by dot and dash lines in Fig. 11, the frames $f'$ and $f$, respectively, are mounted on the inside, a stop S' or S being provided in the outer frame F' or F which is disposed between the window and the swingable frame which may be provided with a screen or a storm sash.

While the improved two-part hinge is disclosed in operative association with two particular types of windows, the same is not limited thereto but is adaptable for removable pivotal connection of any form of inner frame with a fixed outer frame.

Since the members 10 and 11 are of stainless steel same may be left on both the outer frame and inner frame when the latter is not in use and by the provision of the novel two-part hinge the inner frame is capable of being quickly and easily pivotally connected to the outer frame.

Without further description it is believed that the present invention is clearly understandable to others authorized to practice the same. While only two arrangements of the invention are described and illustrated in detail, it is to be expressly understood that other combinations, modifications and arrangements of the parts which will now probably occur to others skilled in the art are to be considered a part hereof. To determine the scope of the present invention, reference should be had to the appended claims.

I claim:

1. A hinge construction for pivotally securing a demountable inner frame to a fixed outer frame, comprising, a first hinge member having an apertured ear pivotally connected to said outer frame, a flat body portion projecting from said ear, a rectangular extension projecting from one edge of said body portion at right angles thereto and adapted to overlie the inner face of a portion of said inner frame, said portion of said inner frame being provided with a hole, said rectangular extension having a tongue member struck therefrom at right angles thereto and extending in spaced, parallel relationship to said body portion, said tongue registering with and receivable in said hole in said inner frame, a second hinge member pivoted on said inner frame for rotational frictional engagement with the said first hinge member and adapted to overlie said first hinge member, thereby locking said first hinge member and said inner frame to each other, said second member comprising an apertured ear for receiving a screw threaded into a tapped hole in said inner frame adjacent said first hole for effecting a pivotal connection of said second member with said inner frame, and said second member including a body portion adapted to overlie said extension for maintaining said tongue in said first hole.

2. The structure according to claim 1, wherein said second member is provided with an outwardly arched portion between said ear and said body portion for rendering the latter yieldable.

3. The structure according to claim 1, wherein said second member is provided with a curved finger grip for facilitating pivotal movement of the second member to and from operative position over said first member.

References Cited in the file of this patent

UNITED STATES PATENTS

| | | |
|---|---|---|
| 601,680 | Romuender | Apr. 5, 1898 |
| 1,284,228 | Brevig | Nov. 12, 1918 |
| 1,783,475 | Johnson et al. | Dec. 2, 1930 |